(12) United States Patent
Haun et al.

(10) Patent No.: US 11,349,357 B2
(45) Date of Patent: May 31, 2022

(54) STATOR-HOUSING UNIT FOR AN ELECTRIC MACHINE

(71) Applicant: Siemens Aktiengesellschaft, Munich (DE)

(72) Inventors: Dominik Haun, Bad Kissingen (DE); Winfried Kessler, Hausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 180 days.

(21) Appl. No.: 16/628,489

(22) PCT Filed: Jun. 12, 2018

(86) PCT No.: PCT/EP2018/065517
§ 371 (c)(1),
(2) Date: Jan. 3, 2020

(87) PCT Pub. No.: WO2019/007646
PCT Pub. Date: Jan. 10, 2019

(65) Prior Publication Data
US 2020/0127507 A1    Apr. 23, 2020

(30) Foreign Application Priority Data

Jul. 6, 2017   (EP) ..................... 17180018

(51) Int. Cl.
*H02K 1/18* (2006.01)
*H02K 5/15* (2006.01)

(52) U.S. Cl.
CPC ............. *H02K 1/185* (2013.01); *H02K 5/15* (2013.01)

(58) Field of Classification Search
CPC ............................. H02K 5/15; H02K 11/185
USPC ................................................... 310/89, 400
See application file for complete search history.

(56) References Cited

U.S. PATENT DOCUMENTS

| | | |
|---|---|---|
| 2008/0061645 A1 | 3/2008 | Yukitake |
| 2010/0187944 A1 | 7/2010 | Ossenkopp et al. |
| 2010/0277031 A1 | 11/2010 | Nelges et al. |
| 2011/0227428 A1 | 9/2011 | Vedy et al. |

FOREIGN PATENT DOCUMENTS

| | | | |
|---|---|---|---|
| CN | 101627521 A | 1/2010 | |
| CN | 102197569 A | 9/2011 | |
| CN | 103540627 A | 6/2014 | |
| DE | 10 2009 001 942 A1 | 9/2010 | |
| DE | 102009001942 A1 * | 9/2010 | ........... H02K 5/1732 |
| DE | 10 2014 221 427 A1 | 4/2016 | |

(Continued)

OTHER PUBLICATIONS

DE102009001942 Machine Translation (Year: 2010).*

(Continued)

*Primary Examiner* — Jose A Gonzalez Quinones
(74) *Attorney, Agent, or Firm* — Henry M. Feiereisen LLC

(57) ABSTRACT

A stator-housing unit for an electric machine includes a housing and a stator connected to the housing and bordering a bearing shield. A deviation in shape for increasing a coefficient of friction between the stator and the housing is realized on at least one subarea of a contact area between the stator and the housing, with the subarea being realized at one end of the stator.

15 Claims, 1 Drawing Sheet

(56) References Cited

FOREIGN PATENT DOCUMENTS

| DE | 10 2014 221 872 A1 | | 4/2016 | |
|---|---|---|---|---|
| DE | 102014221427 A1 | * | 4/2016 | ............. H02K 1/185 |
| DE | 102015213753 A1 | | 1/2017 | |
| JP | 2011/152041 A | | 8/2011 | |
| JP | 2011152041 A | * | 8/2011 | |
| JP | 2015226404 A | | 12/2015 | |
| WO | WO 2009/077088 A2 | | 6/2009 | |

OTHER PUBLICATIONS

PCT International Search Report and Written Opinion of International Searching Authority dated Aug. 20, 2018 corresponding to PCT International Application No. PCT/EP2018/065517 filed Jun. 12, 2018.

* cited by examiner

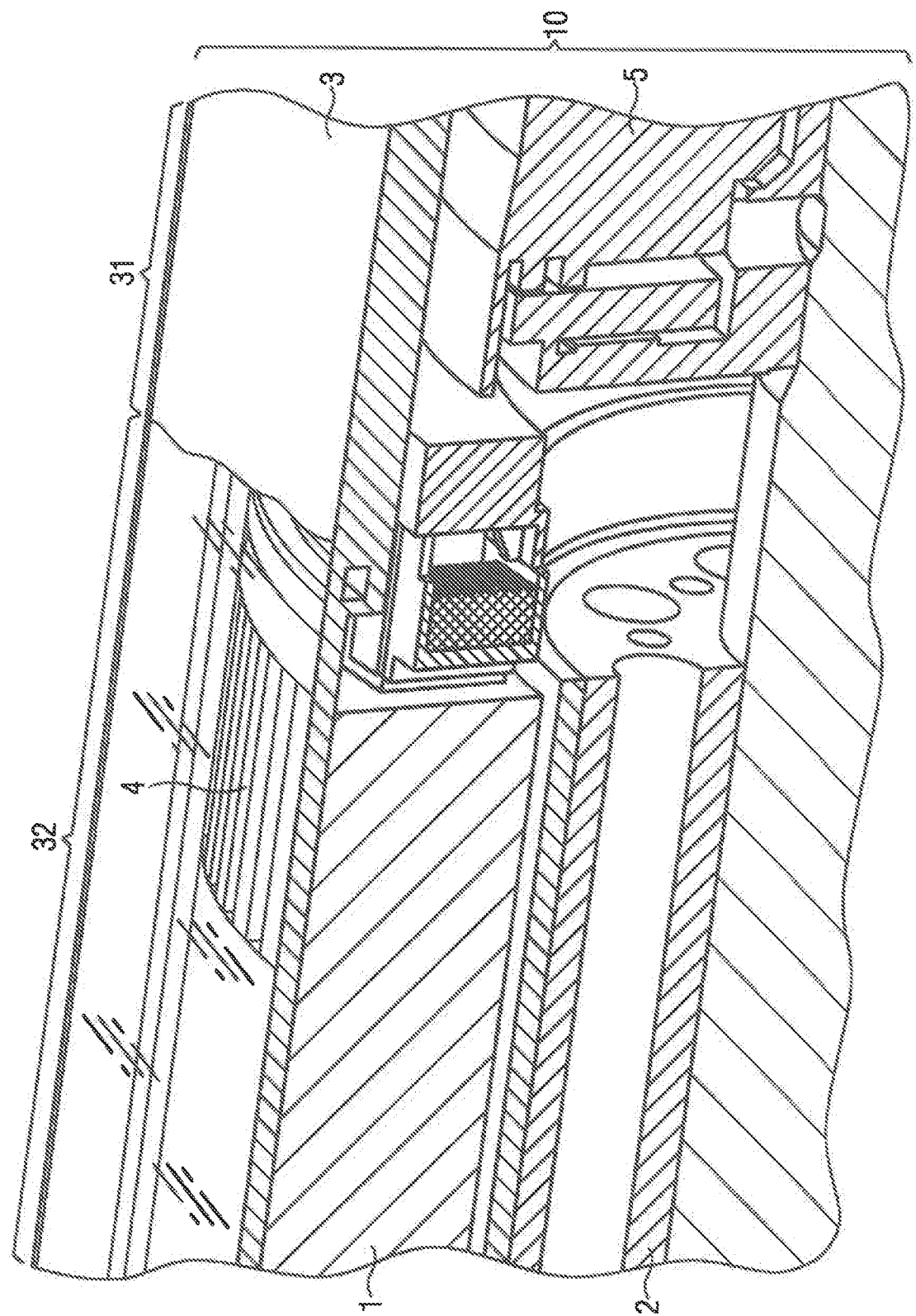

STATOR-HOUSING UNIT FOR AN ELECTRIC MACHINE

CROSS-REFERENCES TO RELATED APPLICATIONS

This application is the U.S. National Stage of International Application No. PCT/EP2018/065517, filed Jun. 12, 2018, which designated the United States and has been published as International Publication No. WO 2019/007646 A1 and which claims the priority of European Patent Application, Serial No. 17180018.8, filed Jul. 6, 2017, pursuant to 35 U.S.C. 119(a)-(d).

BACKGROUND OF THE INVENTION

The invention relates to a stator-housing unit for an electric machine, wherein a stator is connected to a housing.

In order to fasten a stator of an electric machine in a housing provided therefor, it must be ensured that a torque deriving from a rotor of the electric machine can be transmitted from the stator to the housing. Rotation of the rotor in principle has an impact on the stator, as a result of which this has to be connected to the housing in a force-fit manner in order to prevent the stator from rotating jointly with the rotor.

To this end the patent application DE102014221427A1 relates to a device for fastening a stator in a housing, having a housing and a stator arranged in the housing, wherein on its periphery the housing has at least one indentation for fastening the stator to the housing. Provision is made on the periphery of the stator for at least one groove, into which the indentation of the housing projects.

In order to fasten the stator in the housing in this way, a wall thickness of the housing is needed, however, which hinders a compact structure of the electric machine.

Another method according to the prior art, in which the stator is press-fitted into the housing, also has this disadvantage. In this regard high press-fit forces are required. Therefore the wall thickness of the housing must have a certain thickness to ensure that no cracks occur during the press-fitting. Moreover, metallic chips may detach during the press-fitting, which in the worst case result in damage to the electric machine.

If, in an alternative method, the stator is glued into the housing, this adhesive must be cured using heat. For this purpose a further time-consuming work step and an expensive oven are often needed, however.

The patent application WO2009077088A2 describes a method for producing a stator-housing unit for an electric machine, wherein a stator is connected to a housing. Prior to connection at least one subarea of the shared contact areas is coated with a paint material.

The object underlying the invention is to construct an electric machine in a compact manner and quickly.

SUMMARY OF THE INVENTION

The object is achieved by a stator-housing unit for an electric machine, wherein a stator is connected to a housing and wherein a deviation in shape in order to increase a coefficient of friction between the stator and the housing is realized on at least one subarea of a contact area between the stator and the housing.

Moreover, the object is achieved by an electric machine having a stator-housing unit of this type.

Furthermore, the object is achieved by a method for producing a stator-housing unit of this type for an electric machine, wherein a stator is connected to a housing and wherein prior to connection at least one subarea of a contact area between the stator and the housing is provided with a deviation in shape in order to increase a coefficient of friction between the stator and the housing.

The invention is particularly well-suited to electric machines, in particular to electric motors. Especially servomotors which often have to be manufactured in a compact design profit from an inventive design of the stator-housing unit.

The deviation in shape is advantageously realized as a knurling. Advantageously the subarea of the contact area between the stator and the housing is realized on a surface of the stator which points to the housing. This is advantageous in that when the stator and the housing are joined, a possible deformation of the stator is avoided.

Knurlings are deviations in shape which are impressed, milled and/or press-formed into a preferably metal object. The metal object is roughened as a result and is therefore more slip-proof. Knurlings can be impressed particularly well onto a turning machine when the bodies of rotation are turning.

A knurl with paraxial rills is advantageously suited to the knurling of a stator, which is to be connected to a housing, since a stator yoke of the stator is preferably inserted in the axial direction into the housing. A knurl according to DIN 82-RAA 0.5 is particularly suitable, in other words a knurling with paraxial rills and a pitch of 0.5 mm. Other types of knurl can also be used, however.

Moreover, other forms of roughness are also possible as a deviation in shape in order to increase the coefficients of friction between the stator and the housing and can be produced by means of etching and sand-blasting, for instance.

The knurling enables both a force-fit and also form-fit connection of the stator to the housing. As a result, the torque acting on the stator from the rotor can be transmitted to the housing so that when the rotor is rotating the stator and the housing remain still.

In accordance with the invention, the subarea is realized at one end of the stator, which borders a bearing shield, in particular a bearing shield on a B-side of the electric machine. This is advantageous in that when the stator yoke is inserted or press-fitted into the housing, less force has to be applied. Preferably precisely one subarea provided with a knurling is realized at one end of the stator, which borders a bearing shield.

Advantageously the subarea, which has a deviation in shape in order to increase a coefficient of friction, amounts to 10% to 30% of the contact area and is realized all around the stator. A knurling of the entire contact area would namely require more time than a knurling of the subarea and in this regard would moreover require more force when the stator and housing are joined so that a knurling of just 10% to 30% of the contact area is advantageous.

The knurling of the subarea enables the housing to be moved onto the stator or the stator into the housing by means of reduced press-fitting, in order to connect the stator and housing in a force- and form-fit manner. A required effort that has to be exerted is reduced. Moreover, fewer or even no metallic chips detach on account of the reduced press-fitting, as a result of which the risk of damaging the electric machine hereby reduces. Moreover, a wall of the housing can be realized with a more minimal wall thickness, since on account of a smaller press force the wall does not run the risk of tearing.

In one exemplary embodiment, a wall of the housing which was originally 3.6 mm thick can be produced with a thickness of just 2.5 mm by incorporating the cited invention. Electric machines which have the inventive knurling of the stator can therefore be produced in a compact design with respect to height and width.

Since, as a result, less material also has to be expended for the housing, costs can be saved. On account of a good thermal conductivity, aluminum is preferably used as the material for the housing.

The Invention is particularly well-suited to turning, milling and production machines with a torque of 1.2 Nm to 50 Nm.

The inventive knurling allows for a secure connection between the stator and the housing, so that it is possible to dispense with the use of an adhesive. Moreover, it is possible to counteract a requisite draft angle in a casting process by means of the knurling, in order to achieve an adequate press-fit connection.

BRIEF DESCRIPTION OF THE DRAWING

The invention will now be explained with reference to the accompanying drawing, in which the sole FIG. 1 shows a cross-section of an exemplary electric machine.

DETAILED DESCRIPTION OF PREFERRED EMBODIMENTS

FIG. 1 shows a cross-section of an electric machine 10, which comprises a stator 1 and a rotor 2. In the right region 31 of the electric machine 10, a housing 3 can be seen, which is shown definitely available in the left region 32 of FIG. 1, but transparently. On account of a transparency of the housing 3, a deviation in shape which is realized as a knurling 4 in order to increase a coefficient of friction between the stator 1 and the housing 3 on the stator 1 can be identified.

The knurling 4 takes up a subarea of a contact area between the stator 1 and the housing 3 and is realized on a surface of the stator 1 which faces the housing 3. FIG. 1 shows that precisely one subarea is knurled. The knurling 4 is realized as a knurl with paraxial rills and allows for a force-fit and form-fit connection of the stator 1 to the housing 3.

The knurling 4 is embodied at one end, on a so-called B-side of the electric machine, of the stator 1, which borders a bearing shield 5. The subarea provided with the knurling 4 preferably amounts to 10% to 30% of the entire contact area between the stator 1 and the housing 3. FIG. 1 moreover shows that the knurling 4 is realized all around the stator 1.

What is claimed is:

1. A stator-housing unit for an electric machine, comprising:
    a housing; and
    a stator having an end bordering a bearing shield, said stator connected to the housing, thereby defining a contact area having a subarea which deviates in shape from a shape of a remaining part of the contact area to increase a coefficient of friction between the stator and the housing, said subarea being located at the end of the stator and embodied as a knurling or formed by etching or sandblasting to enable a force-fitting connection and a form-fitting connection of the stator to the housing, wherein the subarea is the only subarea embodied at one end of the stator which borders the bearing shield.

2. The stator-housing unit of claim 1, wherein the knurling is formed on the stator.

3. The stator-housing unit of claim 1, wherein the knurling is formed as a knurl with paraxial rills.

4. The stator-housing unit of claim 1, wherein the form-fitting connection of the stator to the housing is implemented without using adhesive.

5. The stator-housing unit of claim 1, wherein the subarea amounts to 10% to 30% of the contact area and is formed all around the stator.

6. An electric machine, comprising a stator-housing unit, said stator-housing unit comprising a housing, and a stator having an end bordering a bearing shield and connected to the housing, thereby defining a contact area having a subarea which deviates in shape from a shape of a remaining part of the contact area to increase a coefficient of friction between the stator and the housing, said subarea being located at the end of the stator and embodied as a knurling or formed by etching or sandblasting to enable a force-fitting connection and a form-fitting connection of the stator to the housing, wherein the subarea is the only subarea embodied at one end of the stator which borders the bearing shield.

7. The electric machine of claim 6, wherein the knurling is formed on the stator.

8. The electric machine of claim 6, wherein the knurling is formed as a knurl with paraxial rills.

9. The electric machine of claim 6, wherein the form-fitting connection of the stator to the housing is implemented without using adhesive.

10. The electric machine of claim 6, wherein the subarea amounts to 10% to 30% of the contact area and is formed all around the stator.

11. The electric machine of claim 6, constructed in the form of a servomotor.

12. A method for producing a stator housing for an electric machine, said method comprising:
    forming on the stator housing unit a subarea of a prospective contact area between a stator and a housing, with the contact area having a sole subarea located at one end of the stator which deviates in shape from a shape of a remaining part of the contact area through knurling or etching or sandblasting; and
    connecting the stator to the housing so that the sole subarea borders a bearing shield by a force-fitting connection and a form-fitting connection, thereby increasing a coefficient of friction between the stator and the housing.

13. The method of claim 12, wherein the knurling is formed on the stator.

14. The method of claim 12, wherein the knurling is formed as a knurl with paraxial rills.

15. The method of claim 12, wherein the subarea amounts to 10% to 30% of the contact area and is formed all around the stator.

* * * * *